US010336920B2

(12) United States Patent
Ellis et al.

(10) Patent No.: US 10,336,920 B2
(45) Date of Patent: Jul. 2, 2019

(54) FOAMABLE HOT MELT ADHESIVE COMPOSITIONS AND USE THEREOF

(71) Applicants: HENKEL AG & CO. KGAA, Duesseldorf (DE); HENKEL IP & HOLDING GMBH, Duesseldorf (DE)

(72) Inventors: Richard Ellis, Buckinghamshire (GB); Dirk Kasper, Duesseldorf (DE); Patrick Markiefka, Duesseldorf (DE); David Duckworth, Blackburn (GB); Jonas Stabel, Munich (DE); Stephane Belmudes, Bernardsville, NJ (US); Patrick Hayes, Ringoes, NJ (US); Andrea Eodice, Hillsborough, NJ (US)

(73) Assignees: HENKEL AG & CO. KGAA, Duesseldorf (DE); HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 14/806,785

(22) Filed: Jul. 23, 2015

(65) Prior Publication Data
US 2015/0322301 A1 Nov. 12, 2015

Related U.S. Application Data

(63) Continuation of application No. PCT/US2013/078446, filed on Dec. 31, 2013.

(60) Provisional application No. 61/756,142, filed on Jan. 24, 2013.

(51) Int. Cl.
| | |
|---|---|
| *C09J 123/08* | (2006.01) |
| *C09J 5/08* | (2006.01) |
| *C09J 11/00* | (2006.01) |
| *C09J 109/00* | (2006.01) |
| *C08J 9/04* | (2006.01) |
| *C08J 9/32* | (2006.01) |
| *C09J 153/02* | (2006.01) |
| *C08L 23/08* | (2006.01) |
| *C08J 9/00* | (2006.01) |
| *C08K 5/23* | (2006.01) |
| *C08K 5/24* | (2006.01) |
| *C08K 9/10* | (2006.01) |

(52) U.S. Cl.
CPC ............ *C09J 123/08* (2013.01); *C08J 9/0061* (2013.01); *C08J 9/04* (2013.01); *C08J 9/32* (2013.01); *C08L 23/0815* (2013.01); *C09J 5/08* (2013.01); *C09J 11/00* (2013.01); *C09J 109/00* (2013.01); *C09J 123/0815* (2013.01); *C09J 153/025* (2013.01); *C08J 2207/02* (2013.01); *C08J 2323/04* (2013.01); *C08J 2453/00* (2013.01); *C08K 5/23* (2013.01); *C08K 5/24* (2013.01); *C08K 9/10* (2013.01); *C09J 2205/11* (2013.01); *C09J 2409/00* (2013.01); *C09J 2423/04* (2013.01); *C09J 2423/043* (2013.01); *C09J 2423/16* (2013.01); *C09J 2453/00* (2013.01); *C09J 2453/003* (2013.01)

(58) Field of Classification Search
CPC ....... B29C 67/202; C08J 5/18; C08J 2379/08; C09D 179/08; B29K 2079/08; B29K 2103/00; B29K 2105/0002; B29K 2105/0073; B29K 2105/251; B29L 2007/008; C08L 2203/14; C08L 2203/16
See application file for complete search history.

(56) References Cited

U.S. PATENT DOCUMENTS

| | | | | |
|---|---|---|---|---|
| 4,059,466 A | * | 11/1977 | Scholl | B27G 11/00 156/500 |
| 4,059,714 A | * | 11/1977 | Scholl | B27G 11/00 156/334 |
| 4,233,432 A | | 11/1980 | Curtis, Jr. | |
| 4,918,112 A | * | 4/1990 | Roox | B32B 5/18 428/318.4 |
| 5,171,628 A | | 12/1992 | Arvedson et al. | |
| 5,256,717 A | | 10/1993 | Stauffer et al. | |
| 5,331,033 A | | 7/1994 | Stauffer et al. | |
| 5,342,858 A | | 8/1994 | Litchholt et al. | |
| 5,369,136 A | | 11/1994 | Park et al. | |
| 5,389,168 A | | 2/1995 | Litchholt et al. | |
| 5,397,843 A | | 3/1995 | Lakshmanan et al. | |
| 6,008,262 A | * | 12/1999 | McKay | C08J 9/122 521/134 |
| 6,169,138 B1 | | 1/2001 | Petit et al. | |
| 6,465,557 B1 | | 10/2002 | De Keyzer et al. | |

(Continued)

FOREIGN PATENT DOCUMENTS

| | | |
|---|---|---|
| CN | 1537136 A | 10/2004 |
| CN | 101698782 A | 4/2010 |

(Continued)

OTHER PUBLICATIONS

Affinity™ GA Polyolefin Elastomers Polyolefin Elastomers for Hotmelt Adhesives, 2012.*

(Continued)

*Primary Examiner* — Irina S Zemel
(74) *Attorney, Agent, or Firm* — Sun Hee Lehmann (57) ABSTRACT

The invention relates to a foamable hot melt adhesive composition, method of foaming the foamable hot melt adhesive composition, and method of using the foamed hot melt adhesive composition. The foamed hot melt adhesive provides a reliable adhesion with high heat resistance for packaging applications. The present invention provides an environmentally and economically sound adhesive that provides sufficient adhesion to the packages upon which it is being applied.

9 Claims, 3 Drawing Sheets

(56) References Cited

U.S. PATENT DOCUMENTS

| | | | |
|---|---|---|---|
| 6,582,829 B1* | 6/2003 | Quinn | C08F 210/16 428/513 |
| 6,833,404 B2 | 12/2004 | Quinn et al. | |
| 7,524,911 B2 | 4/2009 | Karjala et al. | |
| 7,550,528 B2* | 6/2009 | Abhari | C08F 10/06 524/487 |
| 8,124,664 B2 | 2/2012 | Van Rheenen et al. | |
| 8,211,952 B2 | 7/2012 | Kendra et al. | |
| 2004/0250516 A1 | 12/2004 | Maaks et al. | |
| 2007/0042193 A1 | 2/2007 | Wang | |
| 2012/0088091 A1 | 4/2012 | Zoller | |
| 2012/0128833 A1* | 5/2012 | Patel | C09J 123/0815 426/106 |
| 2012/0259050 A1 | 10/2012 | Vitrano et al. | |

FOREIGN PATENT DOCUMENTS

| | | |
|---|---|---|
| DE | 2935580 A1 | 3/1981 |
| JP | 60-203646 A | 10/1985 |
| JP | 517730 A | 1/1993 |
| JP | 8-67861 A | 3/1996 |
| JP | 9-208928 A | 8/1997 |
| JP | 10-509748 A | 9/1998 |
| JP | 2000-141558 A | 5/2000 |
| JP | 2001-130624 A | 5/2001 |
| JP | 2002-542082 A | 12/2002 |
| JP | 2003-55645 A | 2/2003 |
| JP | 2007-246827 A | 9/2007 |
| RU | 2127291 C1 | 3/1999 |
| WO | 9709393 A1 | 3/1997 |
| WO | 2006101966 A1 | 9/2006 |
| WO | 2008005501 A2 | 1/2008 |
| WO | 2008067503 A1 | 6/2008 |
| WO | 2009029476 A1 | 3/2009 |
| WO | 2009100414 A1 | 8/2009 |

OTHER PUBLICATIONS

Quick Reference GuideINFUSE™ Olefin Block Copolymers, 2016.*
Eastotac Hydrocarbon Resins Brochure by the Eastman Company (Aug. 1992).
Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (Technomic Publishing Company, Inc., 1989) p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

* cited by examiner

FOAMABLE HOT MELT ADHESIVE COMPOSITIONS AND USE THEREOF

FIELD OF THE INVENTION

The present invention relates to foamable hot melt adhesive compositions and methods for assembling and sealing cases, trays and cartons.

BACKGROUND OF THE INVENTION

Hot melt adhesives are applied to a substrate while in a molten state and cooled to harden the adhesive layer. Such adhesives are widely used for various commercial and industrial applications including, to seal cardboard cases, bags, trays and cartons; and to bond laminates for nonwoven and foil articles. Some packaging applications require an adhesive to maintain a strong bond to a substrate under extremes of stress and shock in handling. Moreover, cases and cartons often encounter very high temperatures during transportation, so adhesives having sufficiently good heat resistance are required in these applications. "Sufficiently good heat resistance" is to be understood to mean that the bonded adhesive maintains fiber tear at elevated temperature, e.g., greater than 52° C. (125° F.), and hence should not immediately soften when acted upon by elevated temperature, with the result that the adhesive bond loosens and/or the bonded parts shift with respect to one another.

Foamed hot melt adhesives based on various polymers are described in U.S. Pat. Nos. 5,342,858, 5,369,136, 6,008,262 and JP H5-17730. Foamed adhesives contain closed-cell foams with pockets of gas or air in the matrix of the adhesive. There are various economic and environmental benefits to using foamed adhesives, including lower usage, lower cost, lower waste, lower storage requirements, and greater gap filling capability. While the benefits of foamed adhesives are numerous, foamed adhesives typically have lower adhesion and lower reliability than the unfoamed counterpart.

The present invention seeks to improve the reliability and adhesion of foamed hot melt adhesives. In addition, the foamable hot melt adhesives and the packages made therefrom provide more environmentally and economically sound products.

BRIEF SUMMARY OF THE INVENTION

The invention relates to a foamable hot melt adhesive composition, method of foaming the foamable hot melt adhesive composition, and method of using the foamed hot melt adhesive composition. The foamed hot melt adhesive provides a reliable adhesion with high heat resistance for packaging applications. The present invention provides an environmentally and economically sound adhesive that provides sufficient adhesion to the packages upon which it is being applied.

In one embodiment of the present invention, there is provided a foamable hot melt adhesive composition comprising about 90 to about 99.9 wt % of a hot melt adhesive and about 0.1 to about 10 wt % of a block copolymer containing alternating blocks of rigid and elastomeric segments. The foamable hot melt adhesive composition optionally comprises about 0.05 to about 10wt % of a foam cell promoter. Upon foaming, the foamed adhesive has a volume percent of about 20 to about 80 V/V %.

Another embodiment provides a method of foaming the foamable hot melt adhesive, including the steps of: preparing a foamable hot melt adhesive composition comprising about 90 to about 99.9 wt % of a hot melt adhesive and about 0.1 to about 10 wt % of a block copolymer containing alternating blocks of rigid and elastomeric segments; heating the foamable hot melt adhesive into a molten state; mechanically mixing a gas or air into the molten foamable hot melt adhesive composition; and releasing the foamed hot melt adhesive.

Yet another embodiment provides a method of foaming the foamable hot melt adhesive, including the steps of: preparing a foamable hot melt adhesive composition comprising about 90 to about 99.9 wt % of a hot melt adhesive and about 0.1 to about 10 wt % of a block copolymer containing alternating blocks of rigid and elastomeric segments; adding about 0.05 to about 10 wt % of a foam cell promoter into the adhesive until a homogeneous mixture is formed; heating the foamable adhesive composition in the hot melt to one temperature (T1); and then pumping the adhesive into the hose and/or a nozzle, wherein the temperature of the hose/nozzle is at temperature (T2). The T2 is greater than T1, and the adhesive is substantially free of any foams at T1, and the adhesive reaches maximum or near-maximum foam at T2. In this manner the foam is generated immediately prior to application of the adhesive onto a substrate Still another embodiment of the invention provides a method of preparing carton, bag, case or a sealer package, including the steps of: preparing a foamable hot melt adhesive composition comprising about 90 to about 99.9 wt % of a hot melt adhesive, about 0.1 to about 10 wt % of a block copolymer containing alternating blocks of rigid and elastomeric segments, and optionally 0.1 to about 10 wt % of a foam cell promoter; heating the foamable hot melt adhesive into a molten state; and applying the foamed hot melt adhesive onto a substrate of the carton, bag, case or sealer.

DETAILED DESCRIPTION OF THE INVENTION

All documents cited herein are incorporated in their entireties by reference.

The weight percent (wt %) is based on the total weight of the adhesive, prior to any foaming, unless stated otherwise.

The term "polymer" is used herein, refers to a homopolymer or a blend of different (co)polymers.

The present invention is based on the discovery that an addition of 0.1 to 10 wt % of a block copolymer containing alternating blocks of rigid and elastomeric segments into a hot melt adhesive provides a foamable hot melt adhesive with reliable adhesion and improved heat resistance. The foamable adhesive composition described herein may be useful in traditional packaging products such as bags, case, carton or sealers. The foamable adhesive composition is readily used in traditional equipment with very little change to the manufacturing process. Through the use of the inventive foamable adhesive composition, packaging products may be produced with less adhesive and less waste. The end result is an environmentally and economically sound adhesive and packaging product.

In one embodiment, the invention includes a foamable hot melt adhesive composition comprising about 90 to about 99.9 wt % of a hot melt adhesive, about 0.1 to about 10 wt % of a block copolymer containing alternating blocks of rigid and elastomeric segments, and optionally about 0.05 to about 10 wt % of a foam cell promoter. Upon foaming, the foamed adhesive has a volume percent of about 20 to about 80 V/V %, preferably from about 30 to about 70 V/V %.

The hot melt adhesive may be made from any number of materials. Desirably, the hot melt adhesive composition includes a polymer, a tackifier, optionally a wax, plasticizer, oil, stabilizer, and additive. The type of the hot melt adhesives depends on the end-use applications and desired performance properties. Typical hot melt adhesives useful for the inventive foamable hot melt adhesives are thermoplastic polymers; however, thermoset adhesives are contemplated.

The thermoplastic hot melt adhesives may be made from any number of polymers. As used herein, polymers include ethylene-vinyl acetate; ethylene-acrylate; polyolefins; polyamides; polyesters; thermoplastic polyurethanes; reactive polyurethanes; styrene block copolymer; polycaprolactone; polycarbonates; fluoropolymers; silicone rubbers, thermoplastic elastomers; and polypyrrole.

In a preferred embodiment, the hot melt adhesives in the foamable hot melt adhesives include polymers selected from ethylene-vinyl acetate copolymers; ethylene-acrylate copolymers and polyolefins.

The ethylene-vinyl acetate copolymers preferably have a vinyl acetate content less than 40% and a melt index ranges of from about 5 to about 2,500 g/10 min as measured in accordance with ASTM.

The ethylene-acrylate copolymers have an acrylate content less than 40% and a melt index ranges of from about 5 to about 2500 g/10 min as measured in accordance with ASTM D1238. Examples of ethylene-acrylate copolymers include ethylene n-butyl acrylate, ethylene-acrylic acid and ethylene-ethyl acetate.

The polyolefin polymers include $C_2$-$C_{20}$ copolymers and terpolymers. Depending on the monomer and comonomer selection, and the catalyst in the polymerization, the polyolefin may be substantially amorphous, semicrystalline or crystalline. Depending on the desired crystallinity and molecular weight, various combinations of the monomers may be selected as the polymer for the hot melt adhesives. Both metallocene catalyzed polyolefins with narrow molecular weight distributions and non-metallocene catalyzed (Zigler-Natta catalyzed) polyolefins may be chosen as the base polymer for the adhesive.

Examples of preferred polyolefins include ethylene-alpha olefin, e.g., $C_2$ with $C_3$, $C_4$, $C_5$, $C_6$, $C_7$, $C_8$, $C_9$, $C_{10}$, $C_{11}$ and/or $C_{12}$ with a melt index greater than about 5 to about 2,500 g/10 min at 190° C. measured in accordance with ASTM D1238, with the overall crystallinity ranging from about 10% to about 25% of the polymer. Propylene copolymers, e.g., $C_3$ with $C_2$, $C_4$, $C_5$, $C_6$, $C_7$, $C_8$, $C_9$, $C_{10}$, $C_{11}$ and/or $C_{12}$ with a melt index greater than about 5 to about 2,500 g/10 min at 190° C. measured in accordance with ASTM D1238 and overall crystallinity ranging from about 10% to about 25% of the polymer is another preferred olefin.

The polymer content in the thermoplastic hot melt adhesive ranges from about 10 to about 70 wt %, preferably from about 20 to about 60 wt %.

Tackifier is chosen based on the polymer of hot melt adhesives. While miscibility between the tackifier and the polymer is a primary factor in choosing a particular tackifier for a hot melt adhesive composition, less miscible tackifiers may be used in the foamable hot melt adhesives. The tackifier component may typically be present from about 20 to about 80 wt %, preferably from about 30 to about 60 wt %, based on the total weight of the adhesive.

Typical tackifier has a Ring and Ball softening points, as determined by ASTM method E28, of about 70° C. to about 150° C., more preferably of about 95° C. to about 130° C.

Useful tackifying resins may include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Examples of hydrogenated tackifiers particularly suitable include Escorez 5400 from Exxon Mobil Chemicals, Arkon P100 from Arakawa and Regalite S1100 from Eastman Chemical, and the like. Also included are the cyclic or acyclic $C_5$ resins and aromatic modified acyclic or cyclic resins. Examples of commercially available rosins and rosin derivatives that could be used to practice the invention include SYLVALITE RE 110L, SYLVARES RE 115, and SYLVARES RE 104 available from Arizona Chemical; Dertocal 140 from DRT; Limed Rosin No.1, GB-120, and Pencel C from Arakawa Chemical. Examples of commercially available phenolic modified terpene resins are Sylvares TP 2040 HM and Sylvares TP 300, both available from Arizona Chemical.

In one embodiment, the tackifiers are synthetic hydrocarbon resins. Included are aliphatic or cycloaliphatic hydrocarbons, aromatic hydrocarbons, aromatically modified aliphatic or cycloaliphatic hydrocarbons and mixtures thereof.

Non-limiting examples include aliphatic olefin derived resins such as those available from Goodyear under the WINGTACK® Extra trade name and the ESCOREZ® 1300 series from Exxon. A common $C_5$ tackifying resin in this class is a diene-olefin copolymer of piperylene and 2-methyl-2-butene having a softening point of about 95° C. This resin is available commercially under the trade name Wingtack 95. Eastotac series from Eastman are also useful in the invention.

Also useful are aromatic hydrocarbon resins that are $C_9$ aromatic/aliphatic olefin-derived and available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-105° C. and is commercially available from Cray Valley.

Alpha methyl styrene such as Kristalex 3085 and 3100 from Eastman Chemicals, Sylvares SA 100 from Arizona chemicals are also useful as tackifiers in the invention. Adhesives formulated with such alpha methyl styrenes have resultant viscosity of less than about 1500 mPa·s at 121° C. Mixtures of two or more described tackifying resins may be required for some formulations.

Small quantities of alkyl phenolic tackifiers can be blended with additional tackifier agents detailed above to improve the high temperature performance of these adhesives. Alkyl phenolics added in less than 20 wt % of the total weight of the adhesive are compatible and in the proper combination increase high temperature adhesive performance. Alkyl phenolics are commercially available from Arakawa Chemical under the Tamanol trade name and in several product lines from Schenectady International.

The hot melt adhesives of the invention may optionally comprise a wax, plasticizer, oil, stabilizer, and additive.

Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes.

Paraffin waxes that can be used in the practice of the invention include PACEMAKER® 30, 32, 35, 37, 40, 42, 45 & 53 available from Citgo Petroleum, Co.; ASTOR OKERIN® 236 available from Honeywell; R-7152 Paraffin Wax available from Moore & Munger; R-2540 available from Moore and Munger; and other paraffinic waxes such as those available from Sasol Wax under the product designations Sasolwax 5603, 6203 and 6805.

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include VICTORY® Amber Wax, a 70° C. melting point wax available from Baker Petrolite Corp.; BARECO® ES-796 Amber Wax, a 70° C. melt point wax available from Bareco; BESQUARE® 175 and 195 Amber Waxes and 80° C. and 90° C. melt point microcrystalline waxes both available from Baker Petrolite Corp.; Indramic® 91, a 90° C. melt point wax available from Industrial Raw Materials; and PETROWAX® 9508 Light, a 90° C. melt point wax available from Petrowax. Other examples of microcrystalline waxes are Sasolwax 3971 available from Sasol Wax and Microwax K4001 available from Alfred Kochem GmBH.

Exemplary high density low molecular weight polyethylene waxes falling within this category include ethylene homopolymers available from Backer Petrolite Corp. as POLYWAX™ 500, POLYWAX™ 1500 and POLYWAX™ 2000. POLYWAX™ 2000 has a molecular weight of approximately 2000, an Mw/Mn of approximately 1.0, a density at 16° C. of about 0.97 g/cm$^3$, and a melting point of approximately 126° C.

When used, the wax component will typically be present in amounts of up to about 40 wt %, based on the thermoplastic hot melt adhesive. Formulation comprising a wax component will more typically comprise up to about 40 wt %. Preferred waxes have a melt temperature between 49° C. and 121° C., more preferably between 66° C. and 110° C., and most preferable between 82° C. and 104° C.

The adhesives of the present invention may optionally contain a plasticizer, including oil. Suitable plasticizers include polybutenes, polyisobutylene, phthalates, benzoates, adipic esters and the like. Particularly preferred plasticizers include polybutenes and polyisobutylenes, phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils, paraffinic oil, naphthenic oil, aromatic oil, long chain partial ether ester, alkyl monoesters, epoxidized oils, dialkyl diesters, aromatic diesters, alkyl ether monoester and mixtures thereof. In one embodiment, the plasticizer has a number average molecular weight greater than 1000 g/mol. In another embodiment, the plasticizer is typically present up to about 35 wt %, more preferably up to 30 wt %, based on the total weight of the thermoplastic hot melt adhesive.

The hot melt adhesives of the present invention may desirably also contain at least one stabilizer and/or at least one antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include IRGANOX® 565, 1010, 1076 and 1726 which are hindered phenols. These are primary antioxidants which act as radical scavengers and may be used alone or in combination with other antioxidants such as phosphite antioxidants like IRGAFOS® 168 available from Ciba Specialty Chemicals. Phosphite catalysts are considered secondary catalysts and are not generally used alone. These are primarily used as peroxide decomposers. Other available catalysts are CYANOX® LTDP available from Cytec Industries and ETHANOX® 330 available from Albemarle Corp. Many such antioxidants are available either to be used alone or in combination with other such antioxidants. These compounds are added to the hot melts in small amounts, typically less than about 10 wt %, based on the thermoplastic hot melt adhesive, and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as pigments, dyestuffs and fillers conventionally added to hot melt adhesives may be incorporated in minor amounts, i.e., up to about 10% by weight, into the formulations of the present invention.

It has been discovered that the presence of the block copolymer containing alternating blocks of rigid and elastomeric segments aids in producing stable foams and improves the adhesion and heat resistance of the foamed bond. These block copolymer are high molecular weight, low melt index polymers. It is essential that the block copolymer contains alternating blocks of rigid and elastic segments. Not all polymers with high molecular weight and low melt index are useful for the inventive foamable hot melt adhesive and they do not impart the desired properties in the foamed adhesive.

In one embodiment, the alternating blocks of rigid and elastomeric segments is a styrene block copolymers, also known as rubber-based resins. Styrene block copolymers may be linear or radial with multiple arms, greater than 3. Examples of styrene block copolymers include such as styrene-butadiene-styrene, styrene-isoprene-styrene, styrene-ethylene/butylene-styrene, styrene-ethylene/propylene copolymers and the like.

In another embodiment, the alternating blocks of rigid and elastomeric segments component is an olefin block copolymer (OBC) produced by chain shuttling process. OBC has blocks of "hard" (highly rigid crystalline) and "soft" (highly elastomeric amorphous) segments. U.S. Pat. No. 7,524,911 and WO 2009/029476 describe adhesive compositions based on OBC. Other references that describe OBC's and various applications for OBC's include WO 2006/101966, WO 2006/102016, WO 2008/005501, and WO 2008/067503.

The preferred OBC polymer component has a density greater or equal to 0.870 g/cm$^3$, a melt index equal to or greater than 5 g/10 min measured in accordance with ASTM D1238 at 190° C., and a DSC melting point greater than 100° C. The DSC melting temperature may be measured by various known means in the art. The DSC melting temperature values given herein is measured with TA Instruments Q200 Differential Scanning calorimeter. About 5-10 mg of sample was enclosed in hermetically sealed aluminum pans and run against air (empty pan) as reference with nitrogen gas as the carrier gas. The sample was heated above the sample melting point, typically up to 220° C., and held isotherm for 5 minutes. The sample was then cooled at 10° C./min to −50° C., and held isotherm for additional 5 minutes to crystallize. The sample was heated a second time at a rate of 10° C./min. The resulting DSC data was analyzed by peak program and peak temperature, onset temperature and melting temperature determined by the program software. In one embodiment, the OBC comprises a copolymer of ethylene and at least one comonomer selected from $C_{3-10}$ alpha-olefins. In another embodiment, the OBC comprises a copolymer of propylene and at least one comonomer selected from $C_{2, 4-10}$ alpha-olefins. In one particular embodiment, OBC component is an ethylene-octene comonomer. The OBC described above can be purchased from Dow under the trade name INFUSE®.

Preferably, the polymers in the foamable hot melt adhesives have a ratio of about 20:1 to about 2:1 for the hot melt adhesive polymer to the alternating block copolymer. In another embodiment, the ratio of the hot melt adhesive polymer to the alternating block copolymer ranges from about 15:1 to 3:1.

While not bound to any specific theory, it is believed that the presence of the block polymers enhance adhesion, temperature resistance and set time of a hot melt adhesive and this further enables the properties to extend even in the foamed state. The addition also enhances the tensile properties of the hot melt adhesive which enable good adhesion without cohesive failure of a foamed bond. It is believed that the closed-cell foams remain in the matrix of the adhesive and does not aggregate together to rise to the surface of the adhesive and collapse. Thus, the foamed adhesive can be applied with in a closed cell structure and adheres to the substrates. The foamed adhesive has gel-like property, and maintains high modulus even under compression and increased temperature.

The foamable adhesive of the present invention are prepared by blending the components of the hot melt adhesives in a range of about 100° C. to about 130° C. to form a homogeneous blend. The specific temperature is dependent on the minimum temperature at which the blowing agent foams and the molten temperature of the hot melt adhesive. Various methods of blending are known in the art. The molten blend is then cooled and may be formed into pellets, blocks, or films for storage or shipping. These pre-formed adhesives can then be reheated and foamed to apply onto substrates.

Depending on the equipment, various method of foaming the foamable hot melt adhesives can be performed. The foams are generally formed by first melting or re-melting the hot melt adhesive composition into molten state. Preferred methods of foaming are conducted with gases, foam cell promoters or microspheres.

For foaming with gas, the molten thermoplastic composition is mixed under sufficient pressure with a suitable gas to form a solution or dispersion of the gas in the molten thermoplastic composition, thus forming a foamable mixture or solution. Upon a sufficient reduction in pressure, as is caused by dispensing the mixture at atmospheric pressure, the gas evolves from and/or expands in the solution in the form of bubbles in the molten thermoplastic composition to form closed-cell structures in the matrix in the adhesive.

The gas is preferably non-reactive, particularly non-oxidative, including nitrogen, carbon dioxide, inert gases such as argon and helium, and mixtures of such. Although oxidative gases, such as air, are typically not preferred, they may be used for heat-stable and low temperature applicable, e.g., 130-250° C., adhesives.

One suitable method of incorporating the gas into foamable hot melt adhesive utilizes the Foam-Melter 130 system available from the NORDSON®. The foamable hot melt adhesive composition may be mechanically mixed with gas to provide a molten adhesive/gas solution under pressure such that when the adhesive/gas solution is subsequently discharged at atmospheric pressure, the gas is released from the solution and becomes entrapped in the thermoplastic material to form a relatively homogeneous foam.

The thermoplastic adhesive must have an adequate mechanical strength or rigidity to maintain the stability of the foams in the matrix of the adhesive. Viscosity of the adhesive lower than 500 cP is insufficient to keep the foams in the matrix because the foams will collapse, whereas high pressure is required for adhesives with viscosity greater than 1,000,000.

In another method, foam cell promoters are added to the fomable hot melt adhesive to promote foams. For foaming conducted with a foam cell promoter, increasing the temperature above the decomposition of the foam cell promoter, T2, develops gas in the foamable hot melt adhesive and forms closed-cell structures in the adhesive matrix. Typical blowing agents include azobisforamide, semicarbazides, tetrazoles, benzoxazine, hydrazine and liquid fluorocarbons. Preferred foam cell promoters include azodicarbonamide, oxybis(benzenesulfonylhydrazide), toulenesulfonylhydrazide, diphenylsulfone-3,3'-disulfohydrazide, trihydrazinotriazine, p-toulenesulfonyl semicarbazide, 5-phenyltetrazole, isatoic anhydride, sodium bicarbonate, citric acid, and derivatives and combinations thereof. Foams are produced by decomposition of the foam cell promoters at a given elevated temperature. The foam cell promoters may be in range of about 0.05 to about 10 wt %, preferably from about 0.1 to about 8 wt %, more preferably from about 0.5 to about 7 wt %, based on the total foamable adhesive.

Decomposition of the foam cell promoters release N2, CO, NH3, H2O and/or CO2 gases/vapors that forms the foam matrix cells. Based on the decomposition temperature of the foam cell promoter, subjecting the foamable hot melt adhesive to a temperature to or above the decomposition temperature of the foam cell promoter releases gas in the adhesive and foam is created. The foams are in a closed-cell structure. To make a more efficient process, the foamable adhesive is melted at one temperature (T1), and the molten adhesive is moved to a different chamber or nozzle set to a higher temperature (T2), wherein T2 is higher than T1. T2 is typically chosen and varies based on the foam cell promoter decomposition temperature. With the use of pressure, the foamed adhesive pushed out into ambient pressure onto a substrate.

The choice of T2 depends on the decomposition temperature of the foam cell promoter and the viscosity of the hot melt at the application temperature. The T2 of the hose/nozzle must be near, at or higher than the decomposition temperature of the foam cell promoter to initiate decomposition the foam cell promoter and foam the adhesive. However, the T2 should not be too high to decrease the adhesive viscosity to a level that cannot support the foam in the adhesive matrix, e.g., less than 500 cPs.

Additional additives such as a kicker, to alter the decomposition temperature of the foam cell promoters, may be added in combination with the foam cell promoters. Exemplary kickers include zinc oxide, zinc stearate, urea and triethanolamine, and the like.

Microspheres, as pre-expanded and expandable, can also be added to the foamable hot melt adhesive. Upon increasing the temperature of the adhesive, the blowing agents inside the expandable microspheres undergo thermal decomposition and expand the microspheres. Depending upon the temperature at which the thermal decomposition occurs, the melting and foaming of the adhesive can be controlled to meet the desired application needs. For pre-expanded microspheres, they can be directly added to the foamable hot melt adhesive to decrease the density and have closed-cell foamed characteristics.

The foamed adhesive contains about 20 to about 80 V/V %, preferably about 30% to about 70%; more preferably of about 40% to about 60% of foamed gas or air.

While not bound to any specific theory, it is believed that the combination of the alternating blocks of rigid and elastomeric segments and the thermoplastic hot melt adhesive increases the tensile properties of the foamed adhesive so that the cohesive strength of the bond is maintained at an adequate level even as the density of the adhesive is lowered. It is further believed that the closed-cell structure of the foamed adhesives behaves like a gel, because the foamed adhesive has higher compression and modulus values at increased temperature.

In another embodiment of the invention, the heat resistance of the inventive foamed hot melt adhesive composition is improved over a foamed hot melt adhesive without the alternating blocks of rigid and elastomeric segments. The heat resistance of the foamed hot melt adhesive is increased by at least by 5° C. or more over foamed hot melt adhesives without the block copolymer containing alternating blocks of rigid and elastomeric segments. The inventive foamed adhesive has an increased heat resistance of at least 5° C., preferably at least 10° C. over adhesives without the block copolymers. The adhesives may desirably be formulated for conventional and low temperatures application, i.e., formulations that can be applied at temperatures at about 177° C. (350° F.) and down to about 93° C. (200° F.). They provide superior adhesive bonds even when exposed to a wide variety of temperature conditions.

Application of foamable adhesives is known to one of skill in the art. The adhesives of the present invention may be applied to a desired substrate by any method known in the art, and include, without limitation with slot dyes, e.g., Nordson Foammelt 130.

The foamed adhesive may be applied to cardboard cases, bags, books, graphic arts, trays, cartons and sealer. The foamed adhesive may also be applied to films, foils and nonwoven materials to form a laminant. The foamed adhesive may be formed as a tape. The foamable adhesive is applied onto a film, cooled to a specified viscosity or temperature, and a second film may be applied directly on the foamed adhesive, and fully cooled to room temperature to form as an adhesive tape. The tape can be tacky and have pressure sensitive properties. The tape can be coiled together and shipped and stored for future use. Depending on the level of foams in the adhesive, the adhesive has thermal insulative, cushioning, protective and/or pressure sensitive characteristics.

EXAMPLES

Various adhesive samples were prepared with the components shown in Tables 1-5. The adhesives were prepared by combining the components at 130-170° C. until a homogeneous mixture was formed.

TABLE 1

|  | C Ex A | C Ex B | C Ex C | C Ex D | C Ex E | Ex 1 | Ex 2 | Ex 3 | Ex 4 |
|---|---|---|---|---|---|---|---|---|---|
| Ethylene alpha olefin with a MI of 500-1000 g/10 min (ASTM D1238; measured at 190° C.; 2.16 kg) and crystallinity of 15.8-18.3% measured by heat of fusion 292 J/gl | 39.8 | 35 | 0 | 0 | 24.8 | 36.7 | 24.8 | 24 | 5 |
| Ethylene vinyl acetate (EVA) of a mixture of EVAs with a MI of 38-470 g/10 min (ASTM D1238; measured at 190° C.; 2.16 kg) and vinyl acetate content of 27-34% measured by FTIR | 0 | 0 | 35 | 0 | 0 | 0 | 0 | 0 | 0 |

TABLE 1-continued

| | C Ex A | C Ex B | C Ex C | C Ex D | C Ex E | Ex 1 | Ex 2 | Ex 3 | Ex 4 |
|---|---|---|---|---|---|---|---|---|---|
| Ethylene alpha olefin with a MI of 0.2-30 g/10 min (ASTM D1238; measured at 190° C.; 2.16 kg) and crystallinity of 10-35% measured by heat of fusion 292 J/gl | 0 | 0 | 0 | 0 | 5 | 0 | 0 | 0 | 0 |
| EnBA (35% butyl acryalte; ASTM D1238 MI ranging from about 300-900 g/10 min at 190° C.; 2.16 kg) | 0 | 0 | 0 | 27 | 0 | 0 | 0 | 0 | 20 |
| Block copolymer (OBC; Infuse 9808.15) | 0 | 0 | 0 | 0 | 0 | 3 | 5 | 0 | 4 |
| Block copolymer (SEBS) Styrene content of 13-30%, ISO 1133 MI = 5-22 g/10 min at 230° C.; 5 kg | 0 | 0 | 0 | 0 | 0 | 0 | 0 | 5.5 | 0 |
| Partially or fully hydrocarbon Resin | 68.9 | 44.1 | 44.8 | 49.6 | 49.6 | 39.7 | 49.6 | 48.7 | 49.6 |
| Fischer-Tropsch wax | 19.9 | 20 | 19.9 | 22.6 | 19.8 | 19.8 | 19.8 | 21 | 20.6 |
| antioxidant | 0.5 | 0.9 | 0.3 | 0.8 | 0.8 | 0.8 | 0.8 | 0.8 | 0.8 |
| Brookfield Viscosity at 350° F., Spindle 27 | 900 | 900 | 1000 | 900 | N/A | 1000 | 950 | 900 | 1000 |

For the above samples, set time and percent fiber tear were measured with various density reductions and application temperatures. The percent density reduction is noted in Table 2, where 0% denotes no foam in the adhesive. The samples densities were reduced with mechanical agitation and applicator, Nordson Foammelt 130. The percent reduction was measured by a density cup, by controlling the volume and mass of the adhesive. The nozzle temperature of the foam adhesive applicator is shown below as the application temperature. The bead (weight listed in Table 2) was applied across cardboard substrate 5 cm width. This bead was then brought into contact with another cardboard substrate by hand for the listed set time (listed in Table 2). The fiber tear was then measured by examining the % area of the bond which was covered with fibre after the substrates were separated by hand. The value of the fiber tear (% Fibre tear) directly correlates to the strength of the adhesive.

TABLE 2

| Sample | % Density Reduction | Application Temperature/° C. | Bead weight/g | Set time/ sec | % Fibre tear |
|---|---|---|---|---|---|
| C Ex A | 0 | 170 | 0.09-1 | 3 | 100 |
| C Ex A | 50-60% | 170 | 0.06-0.08 | 10 | 5 |
| C Ex A | 30-40% | 170 | 0.06-0.08 | 5 | 60 |
| C Ex A | 40-50% | 180 | 0.06-0.08 | 5 | 10 |
| C Ex A | 40-50% | 180 | 0.08-0.1 | 5 | 10 |
| C Ex B | 50-60% | 170 | 0.06-0.08 | 5 | 0 |
| C Ex B | 50-60% | 170 | 0.06-0.08 | 15 | 100 |
| C Ex B | 50-60% | 180 | 0.06-0.08 | 5 | 10 |
| C Ex B | 50-60% | 180 | 0.06-0.08 | 15 | 80 |
| C Ex C | 50-60% | 150 | 0.07-1 | 5 | 0 |
| C Ex C | 50-60% | 150 | 0.07-1 | 10 | 0 |
| C Ex C | 50-60% | 150 | 0.07-1 | 15 | 100 |
| Ex 1 | 50-60% | 180 | 0.06-0.08 | 5 | 80 |
| Ex 1 | 50-60% | 180 | 0.06-0.08 | 10 | 100 |
| Ex 2 | 50-60% | 180 | 0.05-0.075 | 3 | 90 |
| Ex 2 | 50-60% | 180 | 0.05-0.075 | 5 | 100 |
| Ex 2 | 50-60% | 185 | 0.04-0.07 | 3 | 100 |
| Ex 2 | 50-60% | 185 | 0.04-0.07 | 5 | 100 |
| Ex 3 | 50-60% | 170 | 0.06-0.08 | 2 | 30 |
| Ex 3 | 50-60% | 170 | 0.06-0.08 | 3 | 100 |
| Ex 3 | 50-60% | 180 | 0.06-0.08 | 2 | 20 |
| Ex 3 | 50-60% | 180 | 0.06-0.08 | 3 | 100 |

The unfoamed Comparative Example A had 3 second set time and 100% fiber tear, but increasing the foam content in the adhesive (increasing the percent density reduction) resulted in higher set time and lower % fibre tears. Moreover, the set time and % fibre tear values were inconsistent even with the same % density reduction, application temperature and bead weights for Comparative example C. The examples with a block copolymer with at least 3 second set time had increased % fibre tear values than the comparative examples without the block copolymers.

Heat stress is defined as being the temperature at which a stressed bond fails. In the examples that follow heat stress, or the ability of a hot melt to withstand elevated temperature under cleavage forces (also referred to herein as cleavage heat stress) was used to measure heat resistance. The cleavage heat stress was measured using the same protocol described in WO 2009/1100414. The heat resistances of the above samples were measured with cleavage temperatures and the values are listed in Table 3. The recorded cleavage temperature reflects the temperature at where adhesive softens and the two substrate boards disassociated from one another. At least four samples were tested and the average cleavage temperature values are listed in Table 3. The density was reduced by mechanically agitating the sample to the percent density reduction as shown in Table 3.

TABLE 3

| Sample | % Density Reduction | Application temperature/° C. | Cleavage Temperature/° C. |
|---|---|---|---|
| C Ex A | 0 | 170 | 63 |
| C Ex A | 60% | 170 | 53 |
| C Ex B | 60% | 180 | 49 |
| Ex 1 | 30% | 170 | 60 |
| Ex 1 | 60% | 170 | 57 |
| Ex 2 | 50% | 170 | 64 |
| Ex 3 | 60% | 180 | 58 |

Cleavage temperature for unfoamed Comparative Example A was 63° C.; however reducing the density resulted in less than 55° C. As shown in Table 3, examples with the block copolymers maintained a heat resistance temperature of greater than 55° C. even when applied with 30% reduced density. Foamed adhesives with the block copolymers result in higher heat resistance than foamed comparative adhesives without the block copolymers.

The heat stress of Comparative Example E and Example 2 were measured. 2.5 g of azodicarbonamide was added to 100 g sample adhesives in Table 4, blended until homogeneous, and applied at the noted application temperature. Two 2"×6" corrugated boards (with 2" width) with flutes running down the 2" side were prepared. Adhesive was applied on 2"×2" of the first corrugated board, and the second board was applied with an overlap of 2"×2." The resultant prepared boards had 2" overlap and 4" of single boards on each side. On the overlapped section, 200 g weight was evenly applied at room temperature for 24 hours. After the 24 hours, one side of the 4" board was clamped down, and a 200 g weight was applied at the edge of the other side of the 4" board, and the entire apparatus was placed in the noted temperatures, listed in Table 4. Three tests were conducted at each temperature and determined whether they passed at that temperature. If the apparatus remained intact during the 24 hour test at the listed temperature with the 200 g weight at one edge of the board without delamination, it was deemed to pass.

TABLE 4

| Sample | 135° F. | 140° F. | 145° F. |
|---|---|---|---|
| C Ex E | 3/3 Pass | 3/3 Fail | N/A |
| Ex 2 | 3/3 Pass | 3/3 Pass | 3/3 Pass |

As shown in Table 4, adhesives with the block copolymer (Example 2) resulted in higher heat stress values than adhesives without the block copolymer (Comparative Example E). The use of alternating blocks of rigid and elastomeric segments is an essential part of the foamable hot melt adhesive. Utilizing a high molecular weight, low melt index polymer without the alternating blocks of rigid and elastomeric segments in the foamed adhesive fails to impart heat resistance.

Percent adhesion values of the adhesives are listed in Table 5. The About 3-4 mm diameter bead of adhesives was applied onto a Kraft liner paper substrate at the listed density and application temperature in Table 5. The articles were then stored at the listed storage temperatures for 24 hours prior to testing. The percent adhesion was measured by pulling apart the two substrates apart by hand and examining the percent of the substrate with fibers. 100% Adhesion indicates that the substrate was fully covered with fiber.

TABLE 5

| Sample | % Density Reduction | Application temperature/ ° C. | Storage temperature/ ° C. | % Adhesion |
|---|---|---|---|---|
| C Ex A | 0 | 170 | 23 | 100, 100, 100 |
| C Ex A | 40% | 170 | 23 | 20, 30, 0 |
| C Ex B | 0 | 180 | 23 | 100, 100, 100 |
| C Ex B | 50-60 | 180 | 23 | 60, 50, 50 |
| Ex 1 | 0 | 170 | 23 | 100, 100, 100 |
| Ex 1 | 30 | 170 | 23 | 100, 100, 100 |
| Ex 1 | 60 | 170 | 23 | 100, 100, 100 |
| Ex 3 | 0 | 180 | 23 | 100, 100, 100 |
| Ex 3 | 50-60 | 180 | 23 | 100, 80, 80 |
| Ex 3 | 0 | 180 | 0 | 70, 90, 90 |
| Ex 3 | 50-60 | 180 | 0 | 70, 80, 80 |

As demonstrated in Table 5, foaming the comparative examples resulted in lower % adhesion. Moreover, the percent adhesion values of the foamed examples are similar to those examples without any density reductions at room temperature storage conditions. In addition, Example 3 had similar adhesion values at 0° C. even when the density reduction was 50-60%.

Figure 3:
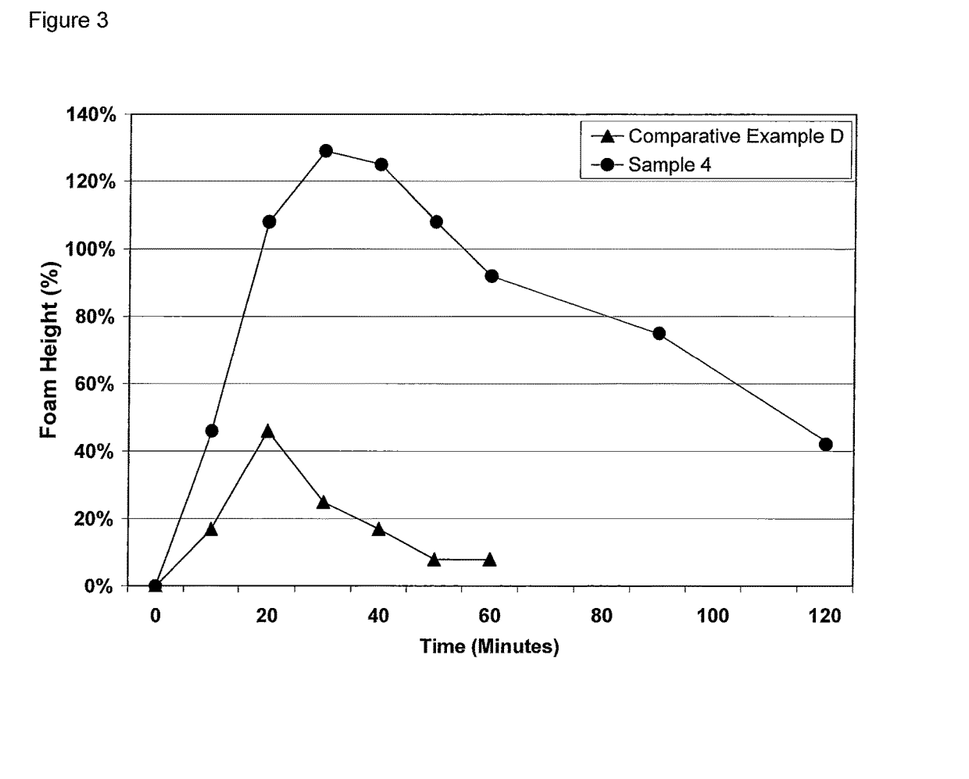
FIG. 3 is a plot of percent height of foams verses elapsed time.

Adhesives with the block copolymers have higher foam height percent for longer periods than adhesives without the block copolymers. Comparative Example D and Example 4 were foamed in the same manner at 350° F. and the height of the foamed adhesive was measured against time. As shown in FIG. 3, Example 4 had much higher peak foam and the foams remained longer in the adhesive than the Comparative Example D without any block copolymer.

Figure 1:
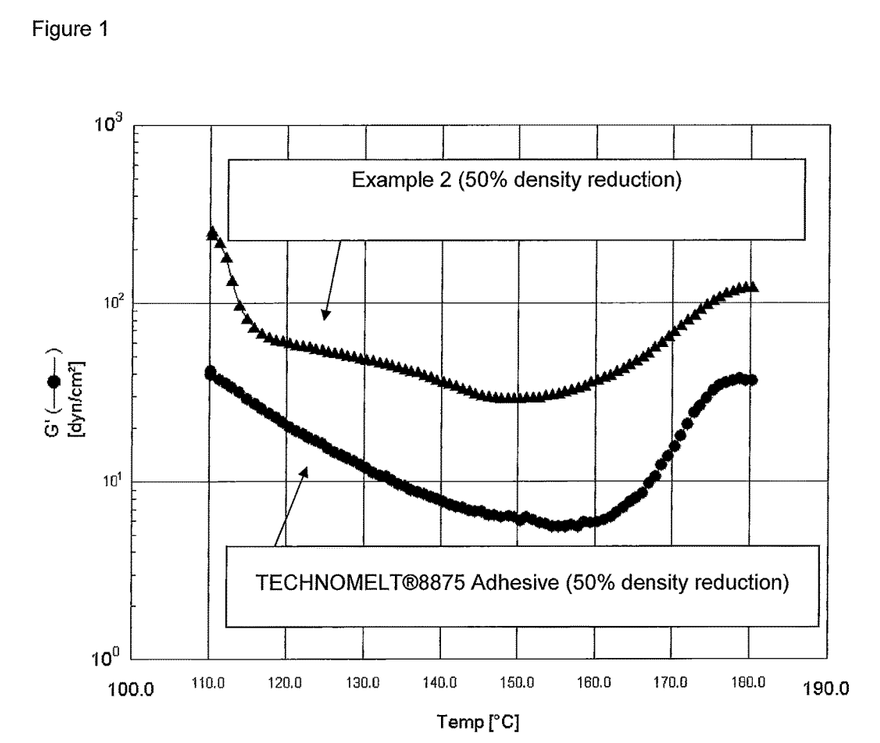
FIG. 1 is ARES curve of modulus verses temperature.

Foamed adhesives with block copolymer have higher modulus at higher temperatures than adhesives without any block copolymers. As shown in FIG. 1, modulus (G') of Example 2 is higher than an ethylene-vinyl acetate based adhesive (TECHNOMELT® 8875 Adhesive, Henkel Corporation) without any block copolymer.

Figure 2:
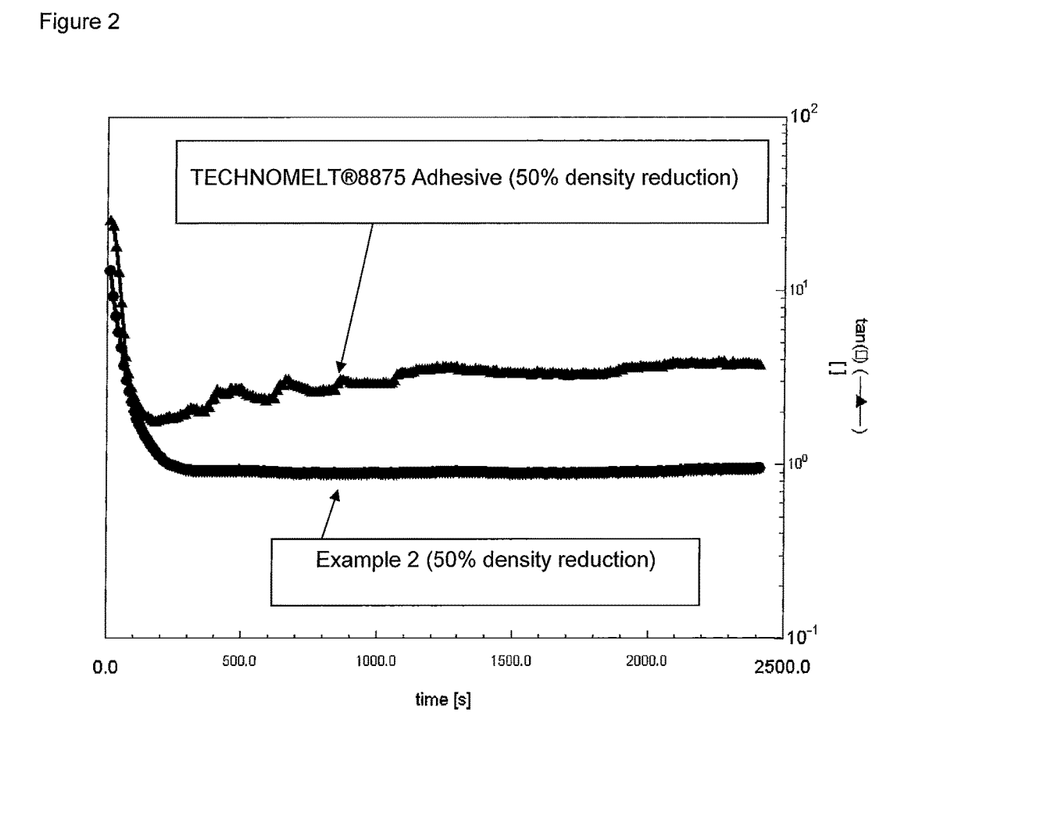
FIG. 2 is ARES time sweep curve of tan δ verses time.

The same adhesives were tested under time sweep conditions, where the modulus was measured against time. As demonstrated in FIG. 2, the tan δ curve of Example 2 has a value of 1. This is the transitional value between liquid and solid, and indicates the gel-like property of adhesives with block copolymer.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A foamed adhesive comprising about 20 to about 80 V/V % of foamed gas or air and 80 to about 20 V/V % of an adhesive composition prepared with
    (a) a hot melt adhesive comprising a polymer selected from the group consisting of ethylene-acrylate, polyolefin, and mixtures thereof, and optionally a wax, a tackifier, a plasticizer, and an additive;
    (b) from about [3] to about 10 wt % of an olefin block copolymer having a melt index of equal to or greater than 5 g/10 min measured in accordance with ASTM D1238 at 190° C. and a DSC melting point greater than 100° C.; and
    (c) optionally, from about 0.05 to about 10 wt % of a foam cell promoter;
    wherein the ratio of the polymer in the hot melt adhesive to the olefin block copolymer is in the range of about 20:1 to about 2:1.

2. The foamed adhesive of claim 1, wherein the polymer has a crystallinity range of from about 5% to about 60%.

3. The foamed adhesive of claim 1, wherein the polyolefin is ethylene-alpha olefin or propylene copolymer.

4. The foamed adhesive of claim 1, wherein the foam cell promoter is a gas, a blowing agent, kicker or a plurality of microspheres.

5. The foamed adhesive of claim 1, wherein the foam cell promoter is selected form the group consisting of azodicarbonamide, oxybis(benzenesulfonylhydrazide), toulenesulfonylhydrazide, diphenylsulfone-3,3'-disulfohydrazide, trihydrazinotriazine, p-toulenesulfonyl semicarbazide, 5-phenyltetrazole, isatoic anhydride, sodium bicarbonate, citric acid and mixtures thereof.

6. The foamed adhesive claim 1, wherein the foamed adhesive has a 50% faster set time and 50% higher adhesion than a foamed adhesive composition without the olefin block copolymer.

7. An article comprising the foamed adhesive of claim 1.

8. The article of claim 7 which is a cardboard case, bag, book, graphic art, tray and carton, sealer or laminant.

9. The foamed adhesive claim 1, wherein the polyolefin is an ethylene-octene copolymer.

* * * * *

UNITED STATES PATENT AND TRADEMARK OFFICE
CERTIFICATE OF CORRECTION

PATENT NO. : 10,336,920 B2
APPLICATION NO. : 14/806785
DATED : July 2, 2019
INVENTOR(S) : Richard Ellis et al.

Page 1 of 1

It is certified that error appears in the above-identified patent and that said Letters Patent is hereby corrected as shown below:

In the Specification

Column 8, Line 60: Change "fomable" to --foamable--.

Signed and Sealed this
Fourth Day of February, 2020

Andrei Iancu
*Director of the United States Patent and Trademark Office*